(12) United States Patent
Seman, Jr. et al.

(10) Patent No.: US 11,125,852 B2
(45) Date of Patent: Sep. 21, 2021

(54) CONSTRUCTION JOBSITE COMPUTER DATA NETWORK AND LOCATION SYSTEM

(71) Applicant: BLACK & DECKER INC., New Britain, CT (US)

(72) Inventors: Andrew E. Seman, Jr., Pylesville, MD (US); Daniel J. White, Baltimore, MD (US); Ryan H. Peloquin, Ellicott City, MD (US); Matthew J. Velderman, Baltimore, MD (US); Randy L. Rhoades, Seward, PA (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 16/313,291

(22) PCT Filed: Aug. 3, 2017

(86) PCT No.: PCT/US2017/045221
§ 371 (c)(1),
(2) Date: Dec. 26, 2018

(87) PCT Pub. No.: WO2018/026988
PCT Pub. Date: Feb. 8, 2018

(65) Prior Publication Data
US 2019/0154792 A1    May 23, 2019

Related U.S. Application Data

(60) Provisional application No. 62/370,292, filed on Aug. 3, 2016, provisional application No. 62/422,270, filed on Nov. 15, 2016.

(51) Int. Cl.
*H04W 64/00* (2009.01)
*G01S 5/02* (2010.01)
(Continued)

(52) U.S. Cl.
CPC .............. *G01S 5/0263* (2013.01); *G01C 5/06* (2013.01); *G01S 13/74* (2013.01); *G01S 19/00* (2013.01);
(Continued)

(58) Field of Classification Search
CPC ........ G01S 5/0263; G01S 19/14; G01S 19/51; G01C 5/06; H04W 4/80; H04W 64/003; G06Q 50/08
(Continued)

(56) References Cited

U.S. PATENT DOCUMENTS 6,225,906 B1 * 5/2001 Shore ................. G08B 21/0238
340/10.5
6,985,967 B1 * 1/2006 Hipp ....................... G06F 1/184
361/788

(Continued)

OTHER PUBLICATIONS

Non-Final Office Action issued in corresponding U.S. Appl. No. 16/313,296, dated Aug. 17, 2020.
(Continued)

*Primary Examiner* — Rafael Pérez-Gutiérrez
*Assistant Examiner* — Xiang Zhang
(74) *Attorney, Agent, or Firm* — Adan Ayala

(57) ABSTRACT

A jobsite computer network has a local server connectable to a remote server via the internet, a network access transceiver connected to the local server, and a wireless device in wireless communication with the network access transceiver. The network access transceiver receives a message from the wireless device and sends a message to the local server. The local server utilizes information from the message to determine the location of the wireless device. The network access transceiver and/or the wireless device generate data which is sent to the remote server.

12 Claims, 4 Drawing Sheets

(51) Int. Cl.
*G01S 19/14* (2010.01)
*G01S 19/51* (2010.01)
*G06Q 50/08* (2012.01)
*G06Q 10/08* (2012.01)
*G01S 19/00* (2010.01)
*G01S 13/74* (2006.01)
*H04W 4/38* (2018.01)
*H04W 4/029* (2018.01)
*H04W 4/35* (2018.01)
*G06K 19/077* (2006.01)
*H04W 4/80* (2018.01)
*G01C 5/06* (2006.01)

(52) U.S. Cl.
CPC .............. *G01S 19/14* (2013.01); *G01S 19/51* (2013.01); *G06K 19/07758* (2013.01); *G06Q 10/08* (2013.01); *G06Q 50/08* (2013.01); *H04W 4/029* (2018.02); *H04W 4/35* (2018.02); *H04W 4/38* (2018.02); *H04W 4/80* (2018.02); *H04W 64/003* (2013.01)

(58) Field of Classification Search
USPC .................. 455/456.1–456.6, 404.2
See application file for complete search history.

(56) References Cited

U.S. PATENT DOCUMENTS

| | | | | |
|---|---|---|---|---|
| 7,184,788 B1* | 2/2007 | Hosain | ................ | H04W 48/18 455/410 |
| 7,502,619 B1* | 3/2009 | Katz | ................ | G01S 5/02 455/456.5 |
| 7,846,397 B2* | 12/2010 | Gregg | ................ | G01K 1/024 340/584 |
| 10,021,521 B1* | 7/2018 | Reeves | ................ | H04W 16/06 |
| 2003/0142673 A1* | 7/2003 | Patil | ................ | H04L 63/08 370/392 |
| 2005/0117556 A1* | 6/2005 | Lee | ................ | H04L 29/06027 370/338 |
| 2007/0063828 A1* | 3/2007 | Drews | ................ | G01N 33/0044 340/442 |
| 2009/0247189 A1* | 10/2009 | Sennett | ................ | H04W 4/021 455/456.2 |
| 2010/0324956 A1* | 12/2010 | Lopez | ................ | G06F 17/5004 705/7.37 |
| 2012/0172055 A1* | 7/2012 | Edge | ................ | G01S 5/0018 455/456.1 |
| 2013/0109375 A1 | 5/2013 | Zeiler | | |
| 2013/0310028 A1* | 11/2013 | Miyagawa | ............ | H04W 8/06 455/433 |
| 2013/0316753 A1* | 11/2013 | Van Dijk | ................ | H04H 60/51 455/517 |
| 2015/0235061 A1* | 8/2015 | Wang | ................ | G06F 16/48 340/10.51 |
| 2016/0047649 A1* | 2/2016 | Edge | ................ | H04W 4/025 455/73 |
| 2016/0226277 A1* | 8/2016 | Wenger | ................ | H02J 7/0054 |

OTHER PUBLICATIONS

Final Office Action issued in corresponding U.S. Appl. No. 16/313,296, dated Dec. 24, 2020.

* cited by examiner

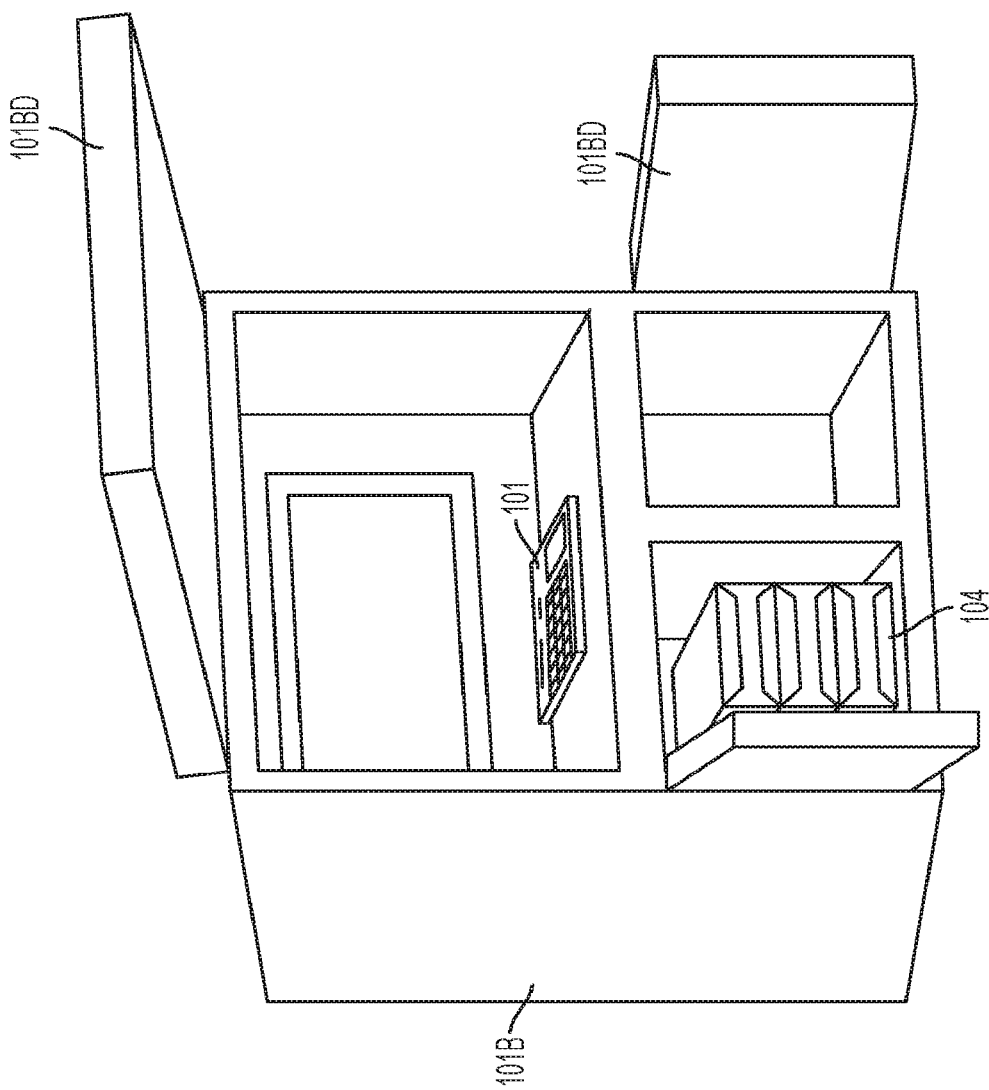

CONSTRUCTION JOBSITE COMPUTER DATA NETWORK AND LOCATION SYSTEM

CROSS-REFERENCE TO RELATED APPLICATIONS

The present application derives priority from U.S. Application No. 62/370,292, filed on Aug. 3, 2016, entitled CONSTRUCTION JOBSITE COMPUTER DATA NETWORK AND LOCATION SYSTEM, and U.S. Application No. 62/422,270, filed on Nov. 15, 2016, entitled CONSTRUCTION JOBSITE COMPUTER DATA NETWORK AND LOCATION SYSTEM, both of which are hereby incorporated in full by reference.

FIELD

The present invention relates to computer data network systems, especially to network systems including wireless location systems for use in construction jobsites, in which wireless mobile devices such as tags, transponders and/or mobile communications devices are located, and preferably tracked, by means of wireless signal transmissions.

BACKGROUND

Location systems are used for locating, and preferably tracking, articles and/or people associated with respective wireless mobile devices. Location systems are used in a wide range of environments, including hospitals and other healthcare situations, social care environments, prisons, industrial locations, warehouses, retail stores, educational institutions, offices and logistics environments, for example. Such systems are used for locating and tracking patients (especially babies and the elderly) and other categories of people, and for locating and tracking medical supplies, equipment, products, tools and other categories of articles.

However, such location systems have not been implemented in construction jobsites due to the lack of network infrastructure, the lack of durable network components, and the inability to provide a temporary network that is easily assembled at the beginning or the construction project and disassembled after the construction project has been completed.

DESCRIPTION OF THE DRAWINGS

Preferred embodiments of the invention will now be described, by way of example, with reference to the accompanying drawings, of which:

FIGS. 2A-2B are front and right side views, respectively, thereof, and FIG. 2C is a block diagram illustrating different components of such transceiver;

FIG. 3 is a perspective view of a local computer disposed in a box assembly according to the invention.

DETAILED DESCRIPTION

Figure 1:
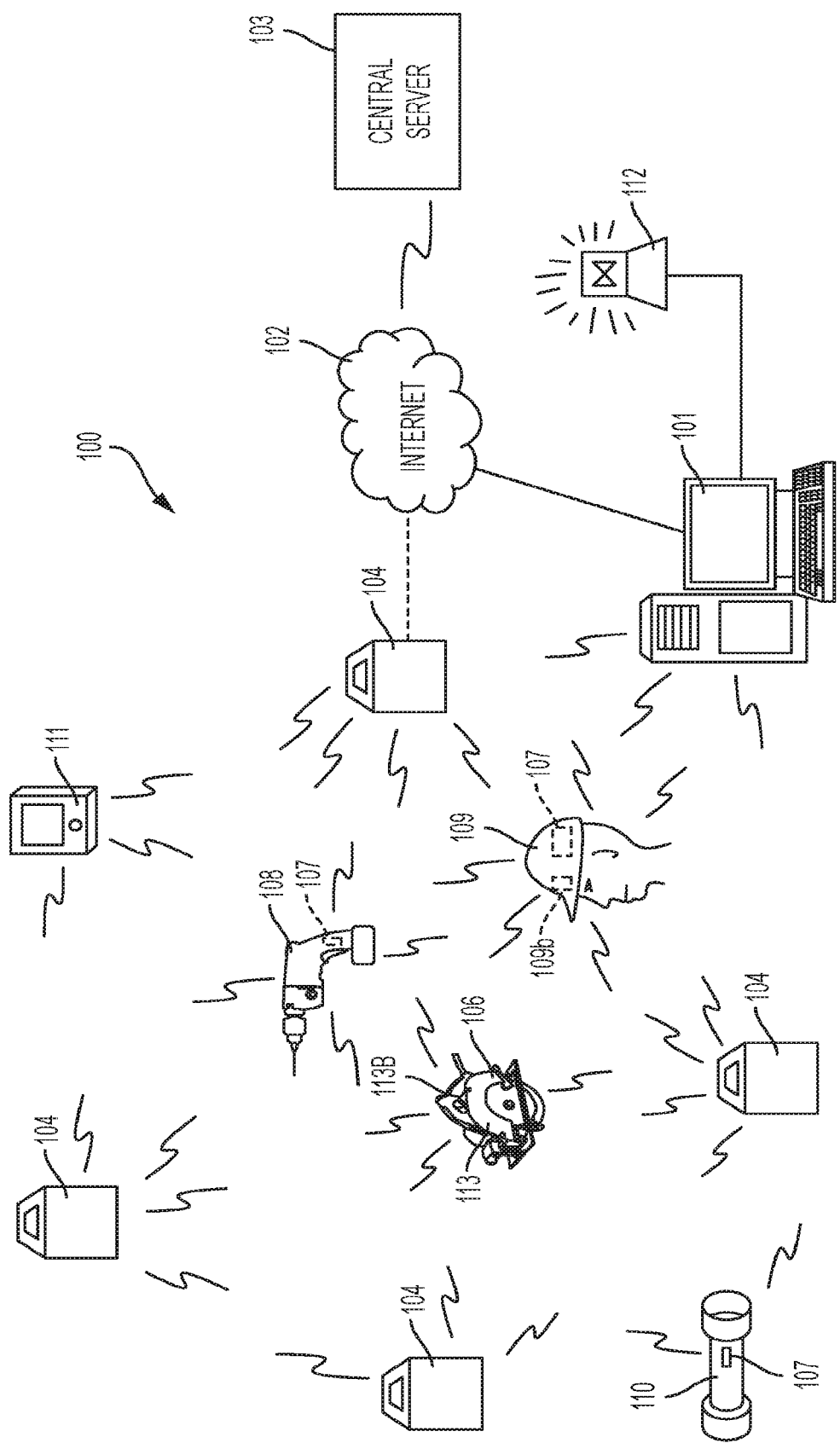
FIG. 1 is a system diagram of a network in which embodiments of the invention may be implemented.

FIG. 1 illustrates a computer network 100 in a construction jobsite. The computer network 100 preferably includes a local server 101 connected to the internet 102. Persons skilled in the art will recognize that local server 101 is preferably connected to the internet 102 via at least one of the following connections: digital subscriber lines (DSL), asymmetric digital subscriber lines (ADSL), symmetric digital subscriber lines (SDSL), very high digital subscriber lines (VDSL), cable-broadband internet connection, wireless broadband connection, T-1 lines, bonded T-1 lines, T-3 lines, optical carrier lines (OC3), internet over satellite (IoS), etc.

Referring to FIG. 3, local server 101 may be disposed in a heavy-duty jobsite box 101B, which is preferably made of steel. Jobsite box 101B may have hinged lockable doors 101B for providing access to local server 101 and/or to other compartments within. As shown in FIG. 3, such compartments may be used to store transceivers 104, as well as other cables, power strips, etc.

Computer network may also include network access transceivers 104. Transceivers 104 may be connectable to the local server 101 via a wired connection, such as an Ethernet network, and/or one or more of a variety of wireless technologies, including: wireless local area network (WLAN) technologies; wireless personal area network (WPAN) technologies (including low-rate wireless personal area network (LR-WPAN) technologies); radio frequency identification (RFID); ultra-wideband (UWB); ultrasound; sound; infrared; visible light; camera vision, etc. Included in WLAN technologies are those conforming to the Institute of Electrical and Electronics Engineers (IEEE) 802.11 series of standards (e.g. Wi-Fi™). Included in WPAN and LR-WPAN technologies are those conforming to the IEEE 802.15 series of standards (e.g. Bluetooth™, ZigBee™, etc.).

Figure 2B:
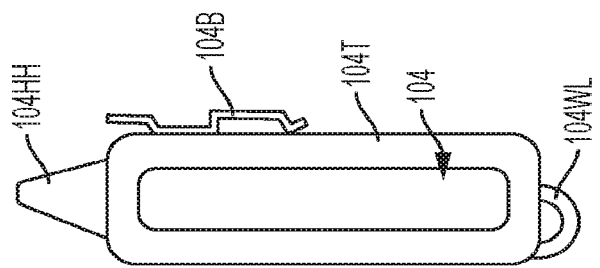
FIGS. 2A-2C illustrate a network access transceiver, where
Figure 2A:
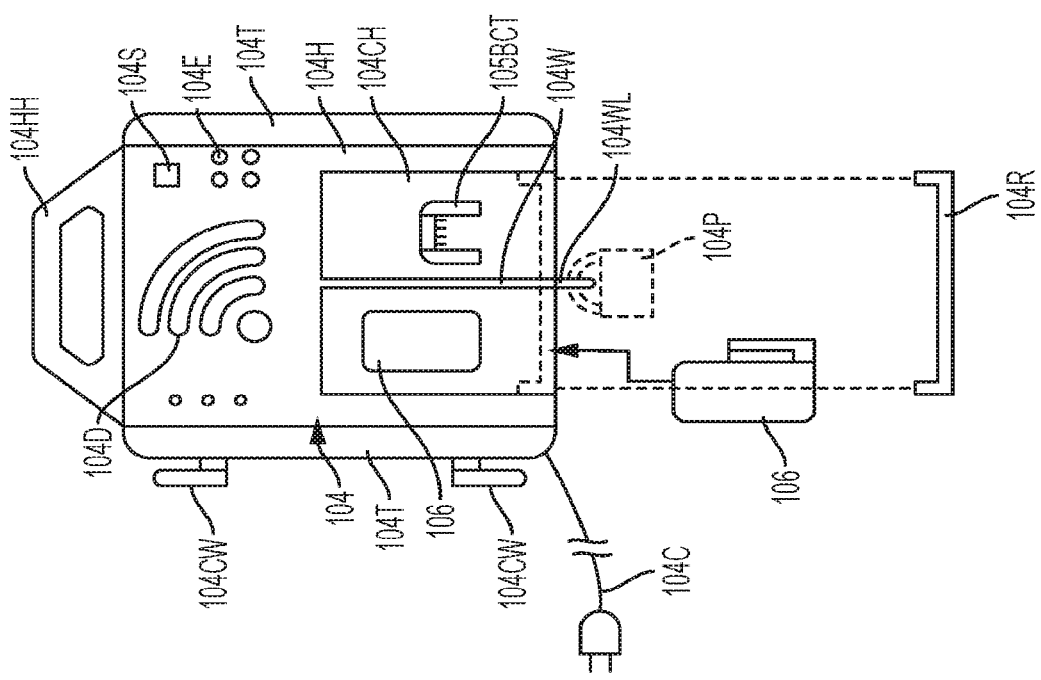

Referring to FIG. 2A-2B, transceiver 104 may have a housing 104H for supporting and/or containing the different electronic components of transceiver 104. In order to make transceiver 104 more rugged for a construction jobsite, housing 104H may have shield or tubes 104T made of aluminium, or other suitable material. Preferably, shield or tubes 104T are made of a plastic, such as ABS or polypropylene. The shield or tubes 104T may be injection-molded.

Alternatively, when the shield is shaped as a tube, the plastic may be injected into a mold (preferably about half the volume needed to complete fill the mold and thus filling half of the mold), then air or gas is blown therein, pushing the plastic into the other half of the mold, forming a hollow tube. This process is known as gas-assist injection molding.

Preferably the protective shield or tubes 104T are flexibly connected to the housing 104H in the manner disclosed in U.S. Pat. No. 6,427,070, which is hereby fully incorporated by reference. As taught in such patent, at least one flexible connector assembly is disposed between housing 104H and protective shield or tubes 104T.

Housing 104H may have a chamber 104CH for receiving power tool battery packs 106 therein. Chamber 104CH may terminals 105BCT for connecting one or more power tool battery packs 106 to a charger circuit 105BC (shown in FIG. 2C).

A wall 104W may be disposed in chamber 104CH for separating the terminals 105BCT (and power tool battery packs 106). Wall 104W may have a loop 104WL at its end.

A removable plate 104R may be moved between a first position separate from housing 104H and a second position adjacent to housing 104H, where loop 104WL extends through plate 104R. A lock 104P may then be attached to loop 104WL, locking plate 104R in the second position.

Persons skilled in the art will recognize that it is preferable to have the direction of plate 104R's movement between the second and first positions be in the same direction as the movement for removing power tool battery pack 106 from terminals 105BCT.

In FIG. 2A, since power tool battery packs 106 have a sliding rail-and-groove configuration, in order to remove power tool battery pack 106 from terminals 105BCT, the power tool battery pack 106 would have to be moved downwardly. By having plate 104R locked in the second position, the user will not be able to move downwardly power tool battery pack 106. Therefore, power tool battery pack 106 would not be removable from chamber 104CH.

Figure 2C:
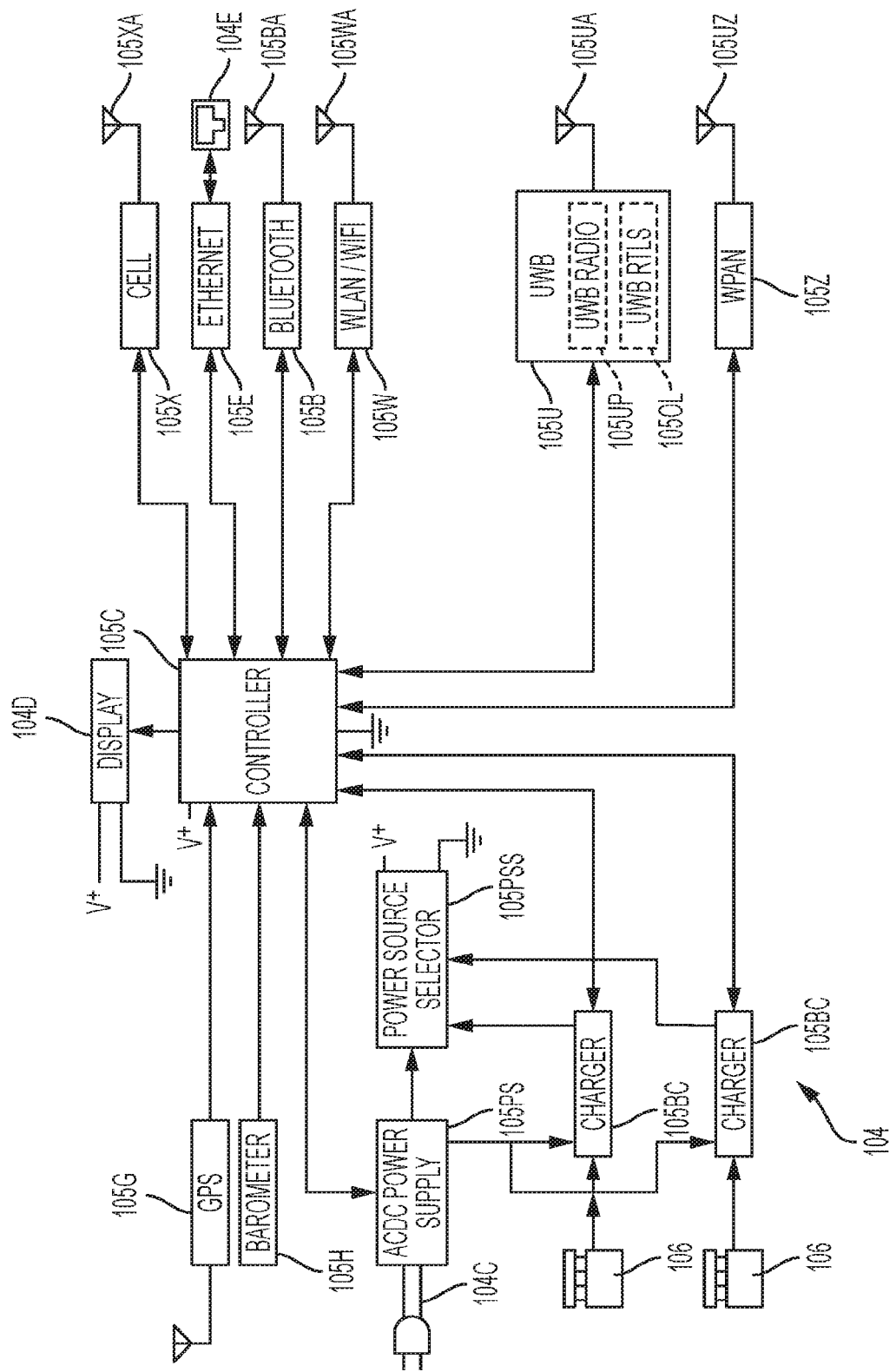

Referring to FIGS. 2A and 2C, housing 104H preferably supports display 104D, on/off switch 104S and/or Ethernet port(s) 104E.

Transceiver 104 may have a power cord 104C which is connected to an AC/DC power supply 105PS. Power cord 104 may be wrapped around two cordwraps 104CW disposed on housing 104H and/or tube 104T.

Referring to FIG. 2B, housing 104H may have a bracket 104B for hanging or attaching transceiver to a wall or other support surface. Bracket 104B may have apertures for catching unto nails, screws, other fasteners, etc. A strap (not shown) may also be attached to bracket 104B for fastening transceiver 104 unto a pole, etc.

Referring to FIG. 2A, housing 104H may have a handle 104HH for facilitating carrying of transceiver 104.

Referring to FIG. 2C, transceiver 104 may have one or more charger circuits 105BC for charging power tool battery packs 106. Charger circuits 105BC may receive power for charging power tool battery packs 106 from AC/DC power supply 105PS.

Persons skilled in the will recognize that other components in transceiver 104 may be powered by AC/DC power supply 105PS and/or power tool battery packs 106 via charger circuits 105BC. Preferably AC/DC power supply 105PS and charger circuit(s) 105BC are connected to a power source selector circuit 105PSS, which selects the power source.

An exemplary power source selector circuit 105PSS is disclosed in U.S. Pat. No. 7,835,534, which is hereby fully incorporated by reference. As such, AC/DC power supply 105PS may power the different circuits in transceiver 104 and charger circuit(s) 105BC (thus charging power tool battery packs 106). If no power is available from AC/DC power supply 105PS, power source selector circuit 105PSS may select to tap into the accumulated power in power tool battery packs 106 via charger circuits 105BC.

Transceiver 104 has a controller 105C which controls many (if not most) of the different components in transceiver 104. For example controller 105C may control and/or receive information from AC/DC power supply 105PS and/or charger circuits 105BC.

Controller 105 may also control display 104D. Display 104D may have a liquid crystal display (LCD), such as a thin-film transistor (TFT) LCD, in-plane switching (IPS) LCD, Super LCD (S-LCD), etc., an organic light emitting diode (OLED) display or active-matrix organic light emitting diode (AMOLED) display, etc. Display 104D may include high intensity multi-color LEDs. Preferably display 104D has an area of at least 4 square inches, so that it is easily visible from a distance. To improve the visibility of the display 104D, it may be desirable to provide engraved features in the bezel or lens of display 104D to concentrate the emission of the light (thus increasing intensity) in one or more pre-determined viewing angles.

Controller 105C may also control different communication circuits, including for example, an Ethernet circuit 105E (which may transmit and/or receive information from Ethernet port(s) 104E), and/or wireless communication circuits. These wireless communication circuits may include a Bluetooth® circuit 105B for transmitting and/or receiving signals and data packaged according to the Bluetooth® protocol from an antenna 105BA, a WLAN/Wi-Fi circuit 105W for transmitting and/or receiving signals and data packaged according to the IEEE 802.11 standard from an antenna 105WA, a wireless personal area network circuit (WPAN) circuit 105Z for transmitting and/or receiving signals and data packaged according to the IEEE 802.15.4 standard from an antenna 105UZ, an ultra-wideband (UWB) circuit 105U for transmitting and/or receiving signals and data packaged according to the IEEE 802.154 standard from an antenna 105UA, and/or a cellular network circuit 105X for transmitting and/or receiving signals and data packaged according to the different cell data standards (such as the Mobile WiMAX or Long Term Evolution (LTE) standards) from an antenna 105XA. Persons skilled in the art shall recognize that WPAN circuit 105Z may be a low-rate wireless personal area network (LR-WPAN) circuit, which could transmit signals under one or more of the following specifications: Zigbee, ISA 100.11a, WirelessHART, MiWi, and Thread.

Persons skilled in the art shall recognize that cellular network circuit 105X can be provided within housing 104H. Alternatively, cell network 105X may be provided as a separate cellular modem that is connectable to transceiver 104 and/or controller 105.

Such different wireless communication circuits allow transceiver 104 to communicate with different device, such as personal computing devices (such as tablets or smartphones 111), and tags 107 disposed or attached to an asset, such as a power tool 108, a wearable item 109 (such as a vest or helmet) worn by a worker, and/or a construction material 110 (such as boards, pipes, slabs, etc.), etc. Persons skilled in the art will recognize that smartphones 111 and tags 107 may use more than one communication protocol to communicate with transceiver 104. For example smartphone 111 may communicate with transceiver 104 via Bluetooth circuit 105B and WLAN/Wi-Fi circuit 105W, etc. Similarly, tag 107 may communicate with transceiver 104 via Bluetooth circuit 105B and WLAN/Wi-Fi circuit 105W, etc. Persons skilled in the art are referred to U.S. Pat. No. 9,357,348, which is hereby fully incorporated by reference, for further information on the functionality and components of tag 107.

With such arrangement, controller 105 can send a message via the Ethernet or wireless communication circuits to local server 101 if AC power is lost at the AC/DC power supply 105B. Controller 105 may also read status information from power tool battery pack 106 and pass such data to local server 101 via the Ethernet or wireless communication circuits. Local server 101 can then pass such data along to central server 103 if so desired.

Alternatively local server 101 or smartphone 111 may send a message to controller 105 via Ethernet or wireless communication. This message could be formatted to contain control commands that would be interpreted by controller 105 to affect the one or more of the devices controlled by controller 105. Examples of this behaviour would be controller 105 receives a command via wired Ethernet to turn off power to the wireless communication circuits 105B, 10W, 105U and/or 105Z during periods of jobsite inactivity. Another example would be where controller 105 receives a command wirelessly from a smartphone 111 to blink an LED 104D of a specific transceiver 104 in a certain pattern, allowing a user to visually identify the specific transceiver 104.

Persons skilled in the art will recognize that the network 100 may have multiple transceivers 104. Preferably transceivers 104 are configured in a mesh network which are directly and/or indirectly connected to local server 101, which may act as a gateway to the Internet 102. Alternatively one or more of the transceivers 104 may be configured to act as a gateway to the internet 102. Persons skilled in the art are referred to U.S. Pat. Nos. 8,341,289 and 9,319,922, which are incorporated herein, for further information on mesh network configurations.

Because of the multiple transceivers 104 in network 100 are disposed throughout the construction jobsite, such arrangement results in a reliable network that would stay active even if AC power is lost (due to the transceivers 104 being powerable by the power tool battery packs 106). In addition, such arrangement allows for workers to have access to charged power tool battery packs 106 and/or chargers for charging a power tool battery pack 106 by simply locating one of the many transceivers 104 throughout the jobsite.

It is preferable to have location services provided in the network 100. Persons skilled in the art will recognize that any of the wireless communication circuits in transceiver 104 could be used for real time location services. For the sake of brevity the following discussion will focus on the UWB circuit 105U being used as such. However persons skilled in the art shall recognize that any of the other wireless communication circuits may be used in a similar manner.

The UWB circuit 105U preferably has a radio circuit 105UR for generating and/or converting radio signals. In addition, UWB circuit 105U may have a UWB location services circuit 105UL for receiving signals from a tag 107 disposed or attached to an asset, such as a power tool 108, a wearable item 109 (such as a vest or helmet) worn by a worker, and/or a construction material 110 (such as boards, pipes, slabs, etc.). The data received from such tags 107 can be analysed by the UWB location services circuit 105UL. The resulting data can then be sent to local server 101 and/or central server 103 for further analysis, reporting, transmission to a central server 103, etc.

Preferably local server 101 and/or central server 103 know the exact location of at least three transceivers 104, either using the GPS coordinates for each transceiver 104 (obtained via GPS receiver circuit 105G) and/or by the installers providing the transceivers' position data based on the design floor plan and/or Building Information Modeling (BIM) data. When an additional transceiver 104 is added to the network 100, the original three transceivers can receive data received from the additional transceiver 104, which is then analysed by the UWB location services circuit 105UL of each original transceiver 104. The resulting data can then be sent to local server 101 and/or central server 103 for further analysis, reporting, transmission to a central server 103, etc. In such manner, the location of the added transceiver 104 is calculated and added to the location database in local server 101 and/or central server 103.

Tag 107 may be built integrally into the wearable item 109. Persons skilled in the art are referred to U.S. Pat. No. 9,177,458, which is fully incorporated by reference, for further information. Wearable item 109 and/or tag 107 may even include a sensor 109S for sensing a condition of the user, such as heart rate, temperature, vibration exposure, etc., or an ambient condition, such as temperature, humidity, etc.

Tags 107 and/or mobile communications and/or computer devices (such as smartphone 111) may communicate with transceivers 104 in an active and/or a passive manner(s). For example, tags 107 and/or smartphones 111 may periodically emit wireless signals indicating their presence, thus functioning as active "beacons." Some of these signals may include an identification message, basically saying "this is tag 0189" or "this is smartphone 3426".

Alternatively tags 107 and/or smartphone 111 may function as transponders, only emitting a wireless signals in response to wireless signals emitted by other wireless emitters of the system. For example, if a transceiver 104 is emitting a wireless signal received by tag 107, tag 107 may respond by sending another wireless signal. In some instances, some of these signals may include an identification message. If for example transceiver 104 sends a signal basically saying "this is transceiver 675", the tag 107 may receive such signal and add its own identification message, to basically say "this is tag 0189, which is now near transceiver 675."

Such data messages can be used to calculate the location of the different tags 107 and other mobile communications and/or computer devices. In addition, other techniques may also be used to further calculate the location of such devices, including for example, time-of-arrival (TOA) where the times at which wireless transmissions from a tag 107 are received at multiple transceivers 104 are used to calculate the location of tag 107. Another technique calculates the differences in times-of-arrival between different wireless transceivers 104 and uses the calculated time-difference-of-arrival (TDOA) information to calculate the location of the tag 107. In these arrangements, the UWB location services circuit 105UL in the different transceivers 104 which received a signal from tag 107 would forward the TOA information to the local server 101, which would then process the TOA information, calculate the TDOA information and/or calculate the location of tag 107.

It may be preferable to provide transceiver 104 with a barometric sensor circuit 105H. The barometric sensor circuit 105H may be connected to controller 105C. Controller 105C can analyse the data received from the barometric sensor circuit 105H, and transmit such data, the results of the data analysis, or an instruction related to such data via at least one of the different communication circuits 105B, 105W, 105E, 105Z, 105X, etc. Persons skilled in the art shall recognize that the barometric data may be indicative of the altitude of transceiver 104, and/or of the floor in which the particular transceiver 104 is located in a multi-floor building.

Accordingly, the transceiver 104 may send a signal to the local server 101 and/or central server 103 to basically say "this is transceiver 675, and the barometric pressure is 760 torr." Local server 101 and/or central server 103 could then calculate the altitude of transceiver 104 based on the barometric pressure.

Alternatively the transceiver 104 may send a signal to the local server 101 and/or central server 103 to basically say "this is transceiver 675, which is estimated to be on the fourth floor." Local server 101 and/or central server 103 can correlate such information with other incoming data. For example, if a tag 107 sends a signal to the local server 101 and/or central server 103 that basically says "this is tag 0189, which is now near transceiver 675," local server 101 and/or central server 103 can display such tag 107 to be also located on the fourth floor.

Persons skilled in the art will recognize that tag 107 may also have a barometric sensor circuit and provide similar information to local server 101 and/or central server 103. Persons skilled in the art will recognize that local server 101 and/or central server 103 may receive barometric data from both the tag 107 and transceiver 104. Local server 101 and/or central server 103 may compare such data. If the difference is within a certain threshold, local server 101 and/or central server 103 can determine that both tag 107 and transceiver 104 are on the same floor. Alternatively, local server 101 and/or central server 103 can compare the barometric data from tag 107 to the barometric data of a transceiver 104 located on the ground floor to determine in which floor tag 107 is located at the moment.

It may be preferable to provide transceiver 104 with a global positioning system (GPS) receiver circuit 105G. The GPS receiver circuit 105G may be connected to controller 105C. The GPS receiver circuit 105G can provide controller 105C with location data. Alternatively controller 105C can analyse the data received from the GPS receiver circuit 105G, and transmit such data, the results of the data analysis, or an instruction related to such data via at least one of the different communication circuits 105B, 105W, 105E, 105Z, 105X, etc.

Additionally or alternatively, the UWB location services circuit 105UL in the different transceivers 104 which received a signal from tag 107 may also calculate the received signal strengths (e.g. received signal strength indication, RSSI) information, angle of arrival (AOA) information, and/or round-trip time (RTT) information and forward to the local server 101 for further analysis. This Information could be forward in turn to the central server 103 via internet 102.

Persons skilled in the art are directed to US Publication Nos. 2015/0156746 and 2015/0185309, which are fully incorporated herein by reference, for more discussion on other location techniques usable to calculate the location of tag 107, etc.

Once the local server 101 and/or central server 103 have calculated the location of a particular tag 107 (or other mobile communications and/or computer device), such location can be displayed on a map shown in the display of local server 101, central server 103, smartphone 111, etc. Preferably such map is derived from Building Information Modeling (BIM) data. Such map can be generated by local server 101 based on the BIM data downloaded unto local server. Alternatively, such map can be generated by the central server 103 from the BIM data.

If the tag 107 is determined to be outside of a predetermined perimeter or area, local server 101 and/or central server 103 can send a message to a user (such as a text message or email sent to a foreman's smartphone 111, a notification placed on an app or website, etc.), sound or activate an alarm 112 in the jobsite, send a deactivation message to the particular tag 107 that would deactivate a device connected to tag 107, and/or send an alarm activation message to the tag 107 to activate a piezo element in tag 107 to make an alarm sound, etc.

Persons skilled in the art shall recognize that network 100 allows for data, such as BIM data, to be downloaded into local server 101, and then passed along transceiver(s) 104 to a particular tablet or smartphone 111. Similarly, data transmitted by tag 107, smartphone 111 and/or an individual transceiver 104 can be passed along to local server 101 via multiple transceiver(s) 104 (acting as repeaters). If desired, local server 101 can then send such data a central server 103 for storage, analysis, etc. Such data may include the number of tags 107 on site, the number of tags 107 assigned to people, tools and/or assets (and thus the number of people, tools and/or assets on site during a particular time period), the number of times tags 107 (or particular individuals) went beyond a particular perimeter, data from sensors 109S, etc.

Because transceiver(s) 104 have a Bluetooth communication circuit 105B, the transceiver(s) 104 can communicate with devices, such as circular saw 113 (shown in FIG. 1), that have a Bluetooth communication circuits, such as circuit 113B. With such arrangement, transceiver(s) 104 can enable communications between circular saw 113 and an out-of-range paired computing device, such as smartphone 111 or local server 101. Persons skilled in the art will recognize that circular saw 113 (and other power tools) may be programmed and/or controlled by a computing device, such as smartphone 111, allowing the user to change parameters, such as maximum speed, maximum torque, trigger/speed profiles, soft-start ramp-up periods, etc., as well as turning on/off the circular saw 113, etc. Such arrangements are further described in US Publication Nos. 2014/0367134 and 2014/0107853, and PCT Publication No. WO 2013/116303, all being fully incorporated herein by reference. Persons skilled in the art should recognize that smartphone 111 may not even be on the jobsite to program circular saw 113, as smartphone 111 can interact with central server 103, which then relays the commands to the circular saw 113 via local server 101, transceiver(s) 104 and/or tags 107.

In one embodiment, circular saw 113 may have been programmed to turn off power thereto if it does not receive a Bluetooth communication signal from the paired smartphone 111. Because transceiver(s) 104 effectively extend the communication range between smartphone 111 and circular saw 113, circular saw 113 may send a message to smartphone 111 (which is relayed by transceiver(s) 104), noting that circular saw 113 is not receiving a direct communication from smartphone 111 and is instead receiving a relayed communication (and is thus farther than a predetermined distance). Circular saw 113 (or the app in smartphone 111) may then query the user whether the user wants to power off circular saw 113, or to blink lights/LEDs on circular saw 113 to help locate it in the jobsite.

The system 100 can also use Bluetooth® (and/or other variants, such as Bluetooth Low Energy (BLE)), to keep track of items that do not have a tag 107 that can process, for example, UWB signals. For example, circular saw 113 may have a Bluetooth communication circuits, such as circuit 113B, but no UWB communication circuit. System 100 can keep track of such items by allowing tags 107 and/or transceiver(s) 104 to receive the Bluetooth signal emitted from circuit 113B. Tags 107 and/or transceiver(s) 104 can pass along a message to local server 101 and/or central server 103 that they have received a message from circuit 113B. Local server 101 and/or central server 103 can use then calculate the position of circuit 113B (and thus of circular saw 113) based on such messages, using triangulation, RSSI and/or other location calculation techniques and algorithms.

Local server 101 and/or central server 103 can continue monitoring the location of circular saw 113 until no other tags 107 and/or transceiver(s) 104 receives a message from circuit 113B. In that case, local server 101 and/or central server can display or note the last calculated position for such circuit 113B It will be understood that the above description and the drawings are examples of particular implementations of the invention, but that other implementations of the invention are included in the scope of the claims.

What is claimed is:
1. A jobsite computer network comprising:
a local server connectable to a remote server via the internet;

a first network access transceiver connected to the local server, the first network access transceiver comprising a housing and a protective tube attached to the housing; and a first wireless device in wireless communication with the first network access transceiver, wherein the first wireless device is one of a tag and a power tool;

a second wireless device in wireless communication with the first wireless device;

wherein the first network access transceiver receives a first message from the first wireless device and sends a second message to the local server, and the local server utilizes information from the second message to determine the location of the first wireless device;

wherein at least one of the first network access transceiver and the first wireless device generate data which is sent to the remote server; and wherein the first wireless device receives a third message from the second wireless device, the first wireless device then sends a fourth message to the first network access transceiver, which then sends a fifth message to the local server, and the local server utilizes information from the fifth message to determine the location of the second wireless device.

2. The jobsite computer network of claim 1, wherein the local server stores construction plan data.

3. The jobsite computer network of claim 1, wherein the local server is disposed within a jobsite box.

4. The jobsite computer network of claim 3, wherein the jobsite box is made of steel.

5. The jobsite computer network of claim 1, wherein the first network access transceiver is connected to the local server via at least one of a wired connection and a wireless connection.

6. The jobsite computer network of claim 1, wherein the first network access transceiver has a terminal connectable to a removable power tool battery pack.

7. The jobsite computer network of claim 6, wherein the first network access transceiver has a lockable feature on the housing for preventing removal of the power tool battery pack.

8. The jobsite computer network of claim 1, wherein at least one of the first network access transceiver and the first wireless device have a barometric sensor so that the local server can determine an elevation of the first wireless device.

9. The jobsite computer network of claim 1, wherein the second wireless device generates data which is sent to the remote server.

10. The jobsite computer network of claim 1, wherein at least one of the local server and the first network access transceiver generates an alarm if the first wireless device is determined to be outside a predetermined location.

11. The jobsite computer network of claim 1, wherein at least one of the local server and the first network access transceiver send data to the first wireless device.

12. The jobsite computer network of claim 11, wherein the data sent by the at least one of the local server and the first network access transceiver effects an operational change in the first wireless device.

* * * * *